US012689475B2

(12) United States Patent
Keating et al.

(10) Patent No.:  US 12,689,475 B2
(45) Date of Patent:  Jul. 21, 2026

(54) ACCURATE SIDELINK POSITIONING REFERENCE SIGNAL TRANSMISSION TIMING

(71) Applicant: Nokia Technologies Oy, Espoo (FI)

(72) Inventors: Ryan Keating, Chicago, IL (US); Tao Tao, Shanghai (CN); Daejung Yoon, Massy (FR); Stephan Saur, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 798 days.

(21) Appl. No.: 17/775,623

(22) PCT Filed: Nov. 13, 2019

(86) PCT No.: PCT/CN2019/118192
§ 371 (c)(1),
(2) Date: May 10, 2022

(87) PCT Pub. No.: WO2021/092813
PCT Pub. Date: May 20, 2021

(65) Prior Publication Data

US 2022/0393820 A1    Dec. 8, 2022

(51) Int. Cl.
H04L 5/00          (2006.01)
G01S 5/10          (2006.01)
(Continued)

(52) U.S. Cl.
CPC .............. H04L 5/0048 (2013.01); G01S 5/10 (2013.01); H04W 56/001 (2013.01); H04W 76/14 (2018.02); G01S 2205/008 (2013.01)

(58) Field of Classification Search
CPC ....... H04L 5/0048; H04L 5/0094; G01S 5/10; G01S 2205/008; G01S 5/0009;
(Continued)

(56) References Cited

U.S. PATENT DOCUMENTS

2007/0189187 A1*  8/2007  Ryu ...................... H04J 3/0682
                                                           370/252
2016/0095080 A1*  3/2016  Khoryaev ............. G01S 5/0284
                                                           455/456.1
(Continued)

FOREIGN PATENT DOCUMENTS

CN        102958154 A      3/2013
CN        106662634 A      5/2017
(Continued)

*Primary Examiner* — Steven Hieu D Nguyen
(74) *Attorney, Agent, or Firm* — Barta Jones, PLLC

(57)                ABSTRACT

According to embodiments of the present disclosure, a PRS transmission timing scheme for sidelink assisted positioning is proposed. According to embodiments of the present disclosure, the supporting terminal device measures a receiving-transmitting (Rx-Tx) time difference between receiving the downlink PRS (DL) and transmitting the sidelink (SL) PRS. The supporting terminal device transmits an indication of the RX-TX time difference to the location management device in order to reduce the impact of low synchronization issue on positioning performance as well as the use of wideband PRS for higher measurement accuracy. In this way, the positioning performance of sidelink assisted positioning has been improved.

9 Claims, 9 Drawing Sheets

(51) Int. Cl.
    *H04W 56/00*        (2009.01)
    *H04W 76/14*        (2018.01)

(58) Field of Classification Search
    CPC ... H04W 56/001; H04W 76/14; H04W 4/023;
                                    H04W 64/00
    See application file for complete search history.

(56)                    References Cited

U.S. PATENT DOCUMENTS

| | | |
|---|---|---|
| 2017/0288897 A1 | 10/2017 | You et al. |
| 2018/0139763 A1 | 5/2018 | Bitra et al. |
| 2018/0231648 A1 | 8/2018 | Zhang |
| 2019/0230618 A1* | 7/2019 | Saur ................... H04W 56/001 |
| 2019/0239181 A1* | 8/2019 | Gangakhedkar ...... H04W 64/00 |
| 2020/0022089 A1* | 1/2020 | Guo ..................... H04L 1/1812 |
| 2021/0219103 A1* | 7/2021 | Wang ................... G01S 5/0236 |

FOREIGN PATENT DOCUMENTS

| | | |
|---|---|---|
| CN | 107113761 A | 8/2017 |
| CN | 109392085 A | 2/2019 |
| CN | 110062457 A | 7/2019 |

* cited by examiner

310

320

330

400

410
RECEIVE THE CONFIGURATION

420
RECEIVE THE DL PRS

430
TRANSMIT THE SL PRS

440
MEASURE THE TIME DIFFERENCE BETWEEN THE DL PRS AND THE SL PRS

450
TRANSMIT THE INDICATION OF THE TIME DIFFERENCE

500

510

TRANSMIT THE CONFIGURATION

520

RECEIVE THE INDICATION OF THE TIME DIFFERENCE

530

RECEIVE THE INDICATION OF THE REFERENCE
SIGNAL TIME DIFFERENCE

540

DETERMINE THE ESTIMATED POSITION

700

710
RECEIVE THE DL PRS

720
RECEIVE THE SL PRS

730
MEASURE THE REFERENCE SIGNAL TIME DIFFERENCE

740
TRANSMIT THE INDICATION OF THE REFERENCE SIGNAL TIME DIFFERENCE

800

ACCURATE SIDELINK POSITIONING REFERENCE SIGNAL TRANSMISSION TIMING

CROSS REFERENCE TO RELATED APPLICATION

This patent application is a U.S. National Stage application of International Patent Application Number PCT/CN2019/118192 filed Nov. 13, 2019, which is hereby incorporated by reference in its entirety.

FIELD

Embodiments of the present disclosure generally relate to communication techniques, and more particularly, to methods, devices and computer readable medium for accurate sidelink positioning reference signal.

BACKGROUND

With developments of communication systems, new technologies have been proposed. A recent study item has been conducted in the third generation partner project (3GPP) for positioning support in new radio (NR) system. A new reference signal for positioning has been introduced in downlink as part of the work item. The terminal devices may measure the reference signal time difference (RSTD) between positioning reference signals (PRSs) from different transmission points in order to perform positioning.

SUMMARY

Generally, embodiments of the present disclosure relate to a method for accurate sidelink positioning reference signal.

In a first aspect, there is provided a method. The method comprises receiving, at a first device and from a second device, a configuration for transmitting a sidelink positioning reference signal. The method further comprises receiving a downlink positioning reference signal from a third device. The method also comprises transmitting the sidelink positioning reference signal to a fourth device. The method yet comprises measuring a time difference between the reception of the downlink positioning reference signal and the transmission of the sidelink positioning reference signal. The method further comprises transmitting an indication of the time difference to the second device and/or the fourth device.

In a second aspect, there is provided a method. The method comprises transmitting, at a second device and to a first device, a configuration for transmitting a sidelink positioning reference signal. The method also comprises receiving an indication of a time difference measured by the first device, the time difference being between a reception of a downlink positioning reference signal by the first device and a transmission of the sidelink positioning reference signal by the first device. The method further comprises receiving an indication of a reference signal time difference from a fourth device, the reference signal time difference being between a reception of the downlink positioning reference signal by the fourth device and a reception of the sidelink positioning reference signal by the fourth device. The method yet comprises determining an estimated position of the fourth device based on the time difference and the reference signal time difference.

In a third aspect, there is provided a method. The method comprises transmitting, at a third device, a downlink positioning reference signal to a first device and a fourth device. The method also comprises receiving a sidelink positioning reference signal from the first device. The method further comprises measuring a time difference between the transmission of the downlink positioning reference signal and the reception of the sidelink positioning reference signal. The method yet comprises transmitting an indication of the time difference to a second device.

In a fourth aspect, there is provided a method. The method comprises receiving, at a fourth device, a downlink positioning reference signal from a third device. The method further comprises receiving a sidelink positioning reference signal from a first device. The method also comprises measuring a reference signal time difference based on the reception of the downlink positioning reference signal and the reception of sidelink positioning reference signal. The method yet comprises transmitting an indication of the reference signal time difference to a second device.

In a fifth aspect, there is provided a first device. The first device comprises at least one processor; and at least one memory including computer program codes; the at least one memory and the computer program codes are configured to, with the at least one processor, cause the first device to receive, from a second device, a configuration for transmitting a sidelink positioning reference signal. The first device is also caused to receive a downlink positioning reference signal from a third device. The first device is further caused to transmit the sidelink positioning reference signal to a fourth device. The first device is yet caused to measure a time difference between the reception of the downlink positioning reference signal and the transmission of the sidelink positioning reference signal. The first device is also caused to transmit an indication of the time difference to the second device and/or the fourth device.

In a sixth aspect, there is provided a second device. The second device comprises at least one processor; and at least one memory including computer program codes; the at least one memory and the computer program codes are configured to, with the at least one processor, cause the second device to transmit to a first device, a configuration for transmitting a sidelink positioning reference signal. The second device is also caused to receive an indication of a time difference measured by the first device, the time difference being between a reception of a downlink positioning reference signal by the first device and a transmission of the sidelink positioning reference signal by the first device. The second device is further caused to receive an indication of a reference signal time difference from a fourth device, the reference signal time difference being between a reception of the downlink positioning reference signal by the fourth device and a reception of the sidelink positioning reference signal by the fourth device. The second device is yet caused to determine an estimated position of the fourth device based on the time difference and the reference signal time difference.

In a seventh aspect, there is provided a third device. The third device comprises at least one processor; and at least one memory including computer program codes; the at least one memory and the computer program codes are configured to, with the at least one processor, cause the third device to transmit a downlink positioning reference signal to a first device. The third device is also caused to receive a sidelink positioning reference signal from the first device. The third device is yet caused to measure a time difference between the transmission of the downlink positioning reference signal and the reception of the sidelink positioning reference signal. The third device is further caused to transmit an indication of the time difference to a second device.

In an eighth aspect, there is provided a fourth device. The fourth device comprises at least one processor; and at least one memory including computer program codes; the at least one memory and the computer program codes are configured to, with the at least one processor, cause the fourth device to receive a downlink positioning reference signal from a third device. The fourth device is also caused to receive a sidelink positioning reference signal from a first device. The fourth device is further caused to measure a reference signal time difference based on the reception of the downlink positioning reference signal and the reception of sidelink positioning reference signal. The fourth device is yet caused to transmit an indication of the reference signal time difference to a second device.

In a ninth aspect, there is provided an apparatus. The apparatus comprises means for performing at least the method according to the above first, second, third or fourth aspect.

In a tenth aspect, there is provided a computer readable medium comprising program instructions for causing an apparatus to perform at least the method according to the above first, second, third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
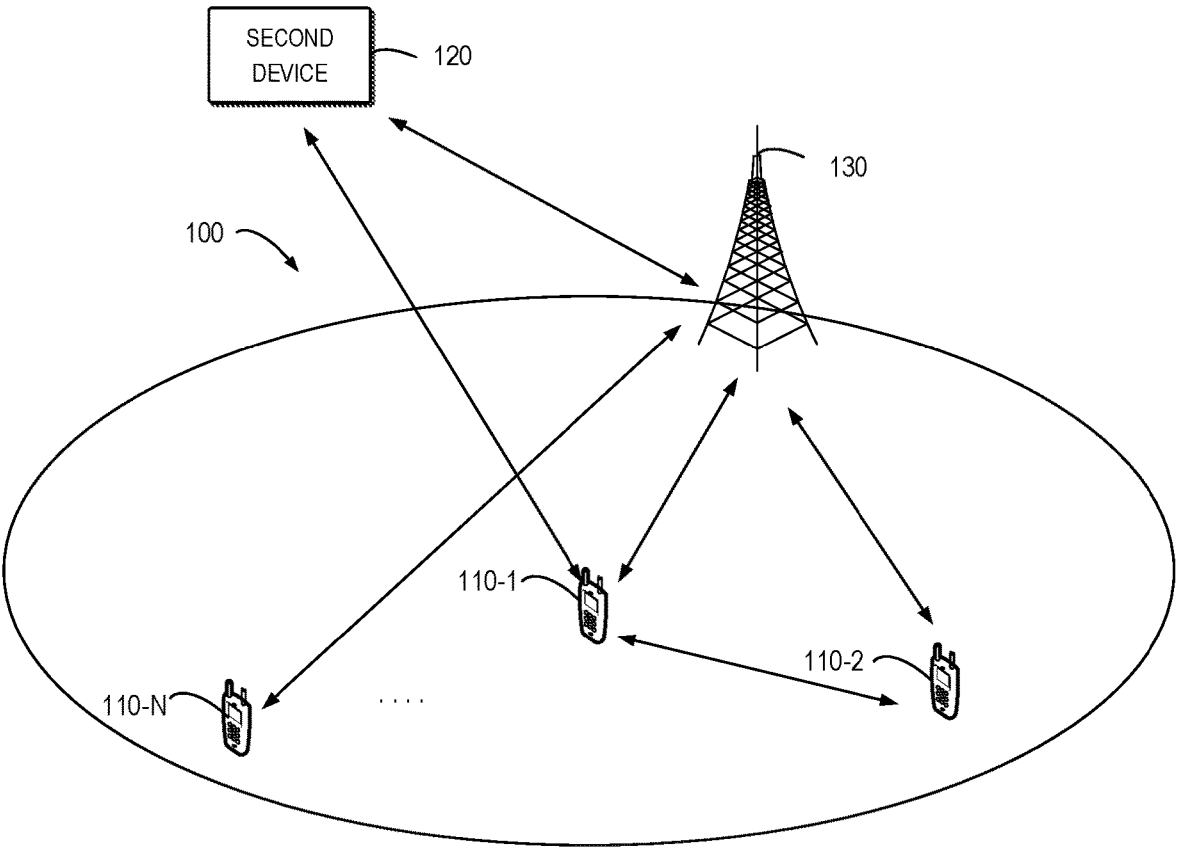
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.65G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

A recent study item has been conducted in the third generation partner project (3GPP) for positioning support in new radio (NR) system. A follow up work item has started to specify positioning support. As the output of the study item phase, it was recommended that the following positioning solutions be specified for NR Release (Rel)-16: downlink Time Difference of Arrival (DL-TDOA); uplink Time Difference of Arrival (UL-TDOA); downlink Angle of Departure (DL-AoD); uplink Angle of Arrival (UL-AoA); and multi-cell Round Trip Time (Multi-RTT).

The new reference signal for positioning has been introduced in downlink as part of the work item. The terminal devices may measure the RSTD between PRS s from different transmission points in order to perform positioning.

In addition to the Rel-16 work to include support for the above positioning methods it is expected that positioning enhancements will continue in future releases. One of the key enhancements for Rel-17 or beyond that is under discussion is support for sidelink positioning of UEs, i.e. vehicle-to-everything (V2X) or On Board Units (OBU) in vehicles.

In DL-TDOA the terminal device may assume that the network devices transmit the PRS at exactly the same time. It then may use the measured time difference of arrival (TDOA) to find its position, or it reports these measurements to the Location Management Function (LMF) in the network. In reality there are errors in the time measurements that come from the synchronization offset which exist between network devices. It is well known that the synchronization offset between base stations is a problem for DL-TDOA. In NR, currently the network devices are only required to be within 3 us of each other for time synchronization purposes in time division duplex (TDD). This is sufficient for data communication, but this type of error is disastrous for positioning where 3 us corresponds to 900 m of ranging error.

There are conventional solutions that can be used to further refine the timing synchronization. However, these conventional solutions do not apply if the terminal devices are assisted by supporting terminal devices to determine the position of a target terminal device. This is referred to as sidelink-assisted positioning. The S-UEs may not be connected to the network via fiber which makes synchronization between all anchor nodes (for example, gNBs and S-UEs) even more challenging.

Therefore, new solutions to overcome the synchronization problem between the network devices and the supporting terminal devices sending the PRS are needed for sidelink assisted positioning. Without such a solution to this problem, RSTD measurement errors may occur and make sidelink assisted positioning very limited in its application.

During long term evolution (LTE), 3GPP has discussed how to accurately synchronize anchor nodes for positioning. However, most conventional solutions assume that the network devices to be synchronized are stationary network nodes and involve signaling between network devices. For example, the method called White Rabbit is limited to stationary devices as well and relies on a wired or fiber connection between a grand master clock and the devices being synchronized.

Therefore, how to solve the synchronization issue between terminal devices and mobile supporting terminal devices for transmitting the PRS in sidelink assisted positioning is necessary.

According to embodiments of the present disclosure, a PRS transmission timing scheme for sidelink assisted positioning is proposed. According to embodiments of the present disclosure, the supporting terminal device measures a receiving-transmitting (Rx-Tx) time difference between when to receive the downlink (DL) PRS and when to transmit the sidelink (SL) PRS. The supporting terminal device transmits an indication of the RX-TX time difference to the core network device in order to reduce the impact of low synchronization issue on positioning performance. In this way, the positioning performance of sidelink assisted positioning has been improved.

FIG. 1 illustrates a schematic diagram of a communication system in which embodiments of the present disclosure can be implemented. The communication system 100, which is a part of a communication network, comprises a device 110-1, a device 110-2, . . . , a device 110-N, which can be collectively referred to as "device(s) 110." The communication system 100 further comprises a device 130. One or more devices are associated with and covered by a cell. It is to be understood that the number of devices and cells shown in FIG. 1 is given for the purpose of illustration without suggesting any limitations. The communication system also comprises a device 120. In some embodiments, the device 120 may be a core network device, for example, location management function (LMF).

In the communication system 100, the device 110 and the device 130 can communicate data and control information to each other. In the case that the device 110 is the terminal device and the device 130 is the network device, a link from the device 130 to the device 110 is referred to as a downlink (DL), while a link from the device 110 to the device 130 is referred to as an uplink (UL). The number of devices shown in FIG. 1 is given for the purpose of illustration without suggesting any limitations. For the purpose of illustrations, the device 110-1 is referred to as the first device 110-1 hereinafter, the device 120 is referred to as the second device 120 hereinafter, the device 130 is referred to as the third device 130 hereinafter and the device 110-2 is referred to as the fourth device 110-2 hereinafter. It also should be noted that the device 110-1 and the device 110-2 can be interchangeable. The term "supporting terminal device" used hereinafter refers to the terminal device that transmits the sidelink positioning reference signal (SL PRS). The term "target terminal device" used hereinafter refers to the terminal device that receives the SL PRS. It should be noted that only for the purpose of illustrations, embodiments of the present disclosure are described with the reference to the DL PRS which is being specify in Rel-16. Embodiments of the present disclosure can apply to any reference signals that are used for positioning (e.g., channel state information reference signal (CSI-RS) for tracking).

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
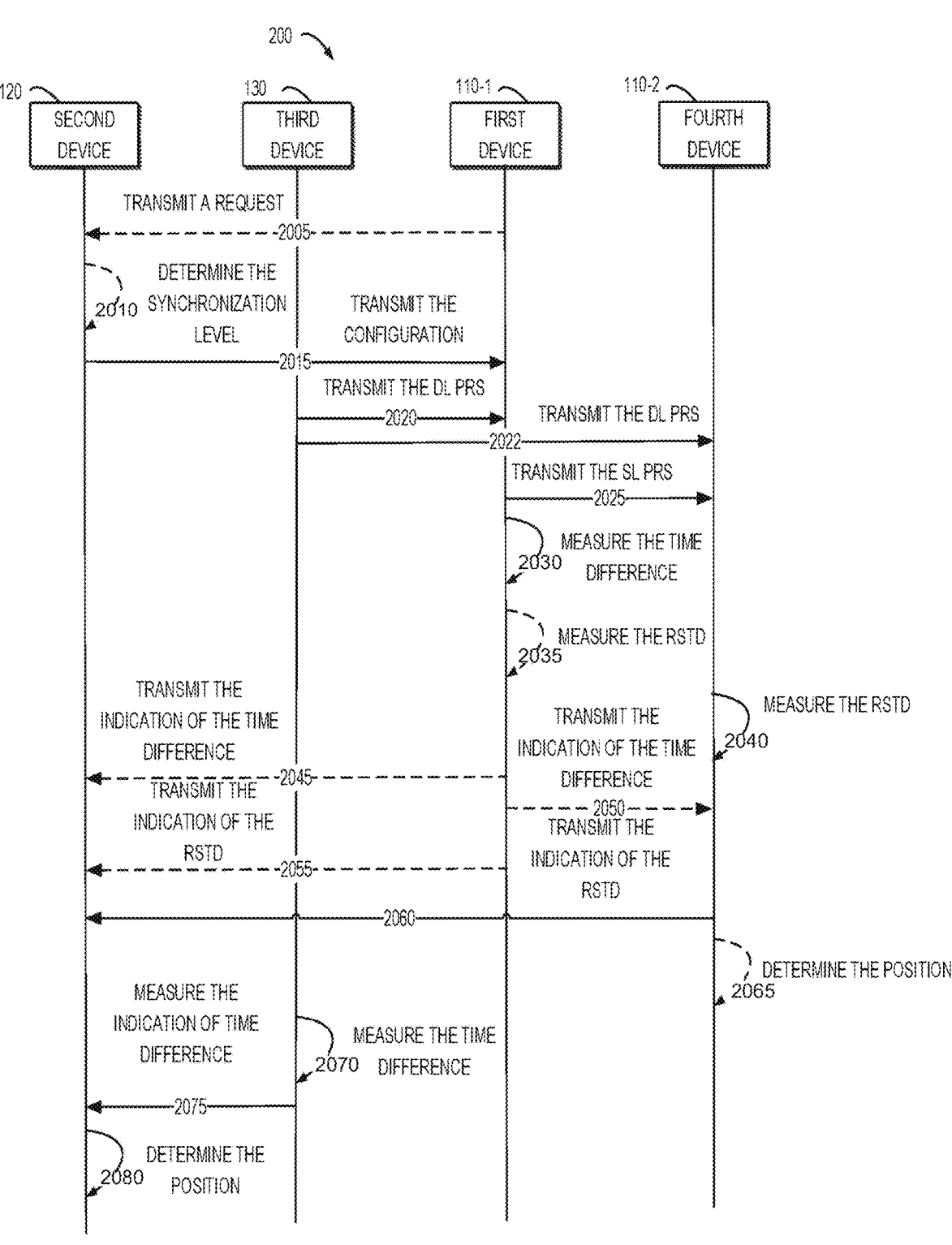
FIG. 2 illustrates a schematic diagram of interactions between devices according to embodiments of the present disclosure.

FIG. 2 illustrates a schematic diagram of interactions 200 among devices in accordance with embodiments of the present disclosure. The interactions 200 may be implemented at any suitable devices. Only for the purpose of illustrations, the interactions 200 are described to be implemented at the first device 110-1, the second device 120, the third device 130 and the fourth device 110-2.

In some embodiments, the first device 110-1 may transmit 2005 a request for sidelink assisted positioning on behalf of the forth device 110-2. Alternatively or in addition, the fourth device 110-2 may transmit a request for sidelink assisted positioning. The first device 110-1 may transmit the request when requesting positioning services. Alternatively, the first device 110-1 may transmit the request when the location positioning protocol (LPP) session is initiated by the second device 120. For example, if the number of network devices that the first device 110-1 can hear is below a threshold number, the first device 110-1 may request sidelink assisted positioning. It should be noted that the location positioning protocol can be any suitable positioning protocols. The LTE positioning protocol is only an example and the location positioning protocol can be any positioning protocols.

In other embodiments, the second device 120 may determine 2010 synchronization levels between the third device 130 and a fifth device (for example, a neighbor network device) to determine whether to configure the sidelink assisted positioning based on. Alternatively or in addition, the second device 120 may determine 2010 synchronization levels between the third device 130 and the first device 110-1 to determine whether to configure the sidelink assisted positioning. If the synchronization level exceeds a threshold level, the second device 120 may determine to configure the sidelink assisted positioning.

For example, the second device 120 may know based on synchronization reports that a target terminal device will only receive the PRS from two network devices within the acceptable error range for time synchronization. In that case the target terminal device 110-2 may need sidelink PRS transmission to meet the accuracy or QoS requirements.

The second device 120 transmits 2015 the configuration for transmitting the sidelink PRS. The configuration may be transmitted in the LPP signaling. Alternatively, the configuration may also be transmitted in other positioning protocol signaling. In some embodiments, the second device 120 may transmit the configuration to measure PRS for sidelink assisted positioning to the fourth device 110-2 (not shown in FIG. 2).

The third device 130 transmits 2020 the DL PRS to the first device 110-1 and transmits 2022 the DL PRS to the fourth device 110-2. The first device 110-1 transmits 2025 the SL PRS to the fourth device 110-2. In some embodiments, the first device 110-1 may receive information indicating that the reception of the DL PRS triggers the transmission of the SL PRS. For example, the information may be transmitted together with the confirmation for transmitting the sidelink PRS. In some embodiments, the information of which radio resources are allocated for SL PRS transmission is part of the assistance information sent from the second device 120 to the first device 110-1 and the fourth device 110-2.

In some embodiments, the reception of the DL PRS and the transmission of the SL PRS may be in synchronous mode. For example, the first device 110-1 may obtain a predetermined time delay between the DL PRS and the SL PRS and transmit the SL PRS based on the predetermined time delay.

Figure 3:
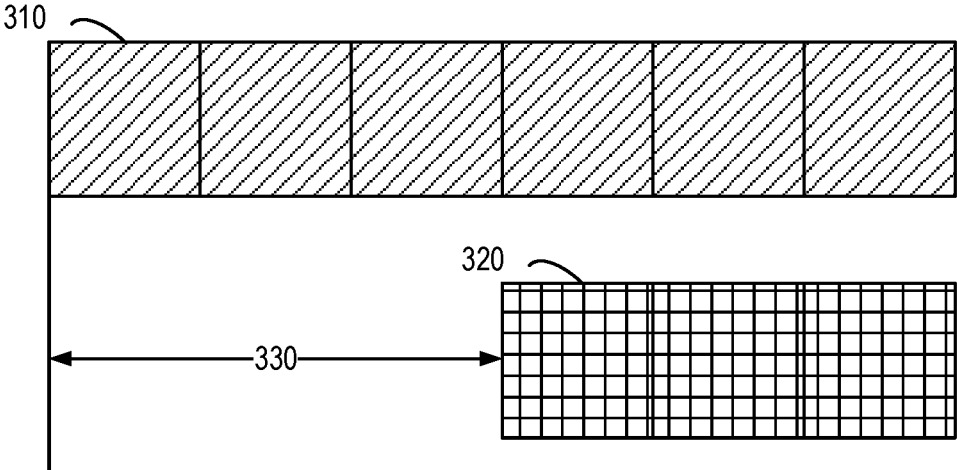
FIG. 3 illustrates schematic diagrams of a transmission of positioning reference signals according to embodiments of the present disclosure.

In some embodiments, the SL PRS may be transmitted in the same slot where the DL PRS is received with a different number of symbols. As shown in FIG. 3, the DL PRS 310 is 6 symbols long and the SL PRS 320 is 3 symbols long. The first device 110-1 may be configured to begin the transmission of the SL PRS 320 aligned with the last symbols of DL PRS 310. In some embodiments, the SL PRS may be transmitted in the next slot after receiving the DL PRS to avoid interference with the DL PRS. Note that while the symbol where the SL PRS is transmitted may be known, the time difference between DL PRS reception and SL PRS transmission is still necessary to be measured. This is due to the high level of accuracy needed for NR positioning use cases.

The configuration parameters of DL PRS and SL PRS can be different. In other embodiments, the first device 110-1 may obtain second information concerning a resource allocated for the transmission of the sidelink positioning reference signal and transmit the SL PRS using the resource. Multiple supporting terminal devices may be configured to transmit SL-PRS to the target terminal device. For example, different random sequence seed or different cyclic shift can be configured for SL-PRS transmissions.

In an example embodiment, the first device 110-1 may obtain a comb offset between the DL PRS and the SL PRS and transmit the SL PRS based on the comb offset.

The comb offset describes by how many subcarriers the grid on which the PRS are transmitted is shifted. The comb offsets can be configured so that the SL PRS and DL PRS are orthogonal in the frequency domain. The DL PRS and SL PRS are then sent on disjoint subcarriers. In one embodiment, the first device 110-1 may be assigned a comb offset to ensure orthogonality between the DL PRS and SL PRS. Alternatively or in addition, semi-orthogonal resource may be allocated to the first device 110-1 such as different random sequence seed or different cyclic shift.

In some embodiments, the reception of the DL PRS and the transmission of the SL PRS may be in asynchronous mode. For example, the first device 110-1 may simply listen to the DL PRS and regard the first symbol of the DL PRS as a trigger. In this situation, after detecting the DL PRS, the first device 110-1 may transmit the SL PRS right away. A guard period after the DL PRS transmission may be reserved to ensure the next slot is not interfered with by the SL PRS.

In an example embodiment, the SL PRS and the DL PRS may be transmitted in the same frequency band or bandwidth part. Alternatively or in addition, the DL PRS and the SL PRS may be transmitted at different frequency bands or bandwidth parts. This may depend on the capabilities of the first device 110-1 and the fourth device 110-2.

The first device 110-1 measures 2030 the time difference between the reception of the DL PRS and the transmission of the SL PRS. In this way, the positioning performance of sidelink assisted positioning has been improved. As shown in FIG. 3, the first device 110-1 may measure the time difference 330 between the reception of the DL PRS 310 and the transmission of the SL PRS 320. In some embodiments, the first device 110-1 may measure 2035 the reference signal time difference (RSTD) based on the reception of the DL PRS. The RSTD may be transmitted from the first device 110-1 to the second device 120.

The fourth device 110-2 measures 2040 the RSTD using the DL PRS received from the second device 120 and the SL PRS received from the first device 110-1. It should be noted that the orders of the measuring 2030, the measuring of 2035 and the measuring 2040 are only examples. For example, due to periodic repetitions of DL PRS and SL PRS, the fourth device 110-2 may measure 2040 the RSTD before the first device 110-1 measures 2030 the time difference or after the first device 110-1 measures 2030 the time difference or at the same time as the first device 110-1 measures 2030 the time difference.

The first device 110-1 may transmit 2045 an indication of the time difference to the second device 120. For example, the first device 110-1 may establish the LPP session with the second device 120 and transmit the indication of the time difference to the second device 120 using the LPP session. The first device 110-1 may transmit 2055 the indication of the RSTD using the DL PRS to the second device 120. The indication of the RSTD may be transmitted together with the indication of the time difference or separately.

Alternatively or in addition, the first device 110-1 may transmit 2050 the indication of the time difference to the fourth device 110-2. In one embodiment, a sidelink communication link between the first device 110-1 and the second device 110-2 may be established and the first device 110-1 may transmit the indication of the time difference to the second device 110-2 via the sidelink communication link. In some embodiments, the fourth device 110-2 can then transmit the indication of the time difference to the second device 120.

The fourth device 110-2 transmits 2060 an indication of the RSTD measured based on the DL PRS received from the second device 120 and the SL PRS received from the first device 110-1 to the second device 120. In some embodiments, the fourth device 110-2 may determine 2065 its position based on the RSTD measured by the fourth device 110-2 and the time difference measured by the first device 110-1. In some embodiments, the fourth device 110-2 may receive the time difference measured by the first device 110-1 directly from the first device 110-1. Alternatively or in addition, the fourth device 110-2 may receive the time difference measured by the first device 110-1 from the second device 120.

In some embodiments, the third device 130 may measure 2070 a Tx-Rx time difference between when it transmits DL PRS and when it receives SL PRS from the first device 110-1. In addition, the third device 130 may transmit 2075 the indication of the Tx-Rx time difference to the second device 120. In a further embodiment, the second device 120 may use the Tx-Rx time difference received from the third device 130 together with Rx-Tx time difference received from the first device 110-1 to obtain the propagation delay between the first device 110-1 and the third device 130.

The second device 120 determines the position of the fourth device based on the time difference from the first device 110-1 and the RSTD from the fourth device 110-2. In some embodiments, the second device 120 may update the RSTD from the fourth device 110-2 by using the time difference from the first device 110-1 with the propagation delay between the first device 110-1 and the third device 130. In this way, errors in synchronization may be significantly smaller. The position of the first device 110-1 must be known to the second device 120. In some embodiments, the position of the first device 110-1 can be estimated by the second device 120 through the RSTD received from the first device 110-1. In case the first device 110-1 is a vehicle, robot, or drone, it may be equipped with an RTK (real time kinematic)—GNSS receiver achieving high accuracy positioning accuracy.

According embodiments of the present disclosure, it is improved positioning performance of sidelink assisted positioning by mitigating the errors due to timing offset between the first device 110-1 and the third device 130. Further, it is to require positioning of a target terminal device using only two network devices which are synchronized. Embodiments of the present disclosure allow a solution which does not require the introduction of a full synchronization process between supporting terminal device and the network device.

Figure 4:
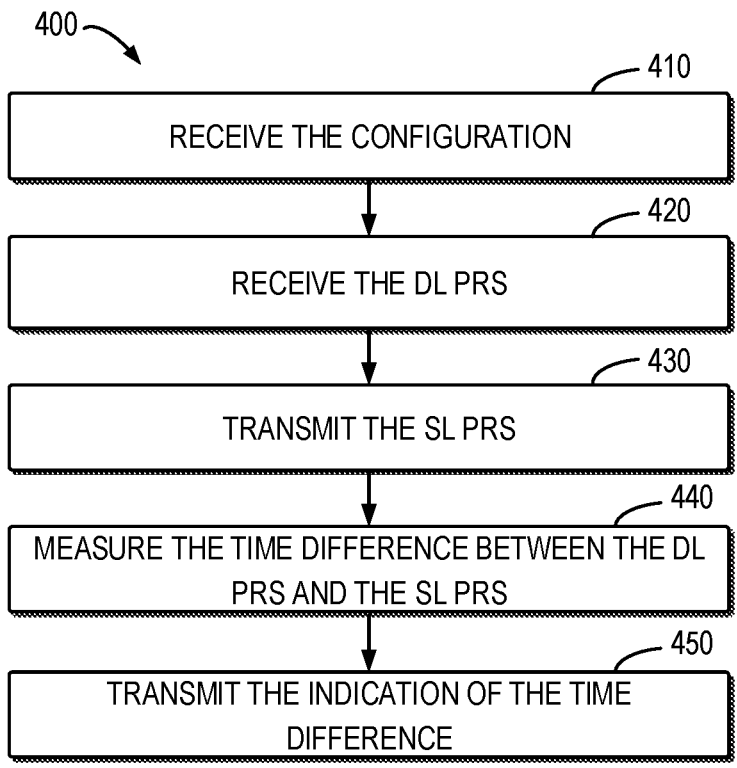
FIG. 4 illustrates a flow chart of a method according to embodiments of the present disclosure.

FIG. 4 illustrates a flow chart of method 400 according to embodiments of the present disclosure. The method 400 can be implemented at any suitable devices. For example, the method may be implemented at the first device 110-1.

In some embodiments, the first device 110-1 may transmit a request for sidelink assisted positioning. The first device 110-1 may transmit the request when requesting positioning services. Alternatively, the first device 110-1 may transmit the request when the LPP session is initiated by the second device 120. For example, if the number of network devices that the first device 110-1 can hear is below a threshold number, the first device 110-1 may request sidelink assisted positioning on behalf of the forth device 110-2. In other embodiments, the fourth device 110-2 may request the sidelink assisted positioning.

At block 410, the first device 110-1 receives the configuration for transmitting the sidelink PRS. The configuration may be transmitted in the LPP signaling. Alternatively, the configuration may also be transmitted in other positioning protocol signaling.

At block 420, the first device 110-1 receives the DL PRS from the third device 130. In some embodiments, the first device 110-1 may listen to the DL PRS.

At block 430, the first device 110-1 transmits the SL PRS to the fourth device 110-2. In some embodiments, the first device 110-1 may receive information indicating that the reception of the DL PRS triggers the transmission of the SL PRS. For example, the information may be transmitted together with the confirmation for transmitting the sidelink PRS. In some embodiments, the information which radio resources are allocated for PRS transmission is part of the assistance information sent from the second device 120 to the first device 110-1 and the fourth device 110-2.

In some embodiments, the reception of the DL PRS and the transmission of the SL PRS may be in synchronous mode. For example, the first device 110-1 may obtain a predetermined time delay between the DL PRS and the SL PRS and transmit the SL PRS based on the predetermined time delay.

In some embodiments, the SL PRS may be transmitted in the same slot where the DL PRS is received with a different number of symbols. In some embodiments, the SL PRS may be transmitted in the next slot after receiving the DL PRS to avoid interference with the DL PRS.

The configuration parameters of DL PRS and SL PRS can be different. In an example embodiment, the first device 110-1 may obtain a comb offset between the DL PRS and the SL PRS and transmit the SL PRS based on the comb offset. The comb offsets can be configured so that the SL PRS and DL PRS are orthogonal in the frequency domain. The DL PRS and SL PRS are sent on disjoint subcarriers.

In other embodiments, the first device 110-1 may obtain second information concerning a resource allocated for the transmission of the sidelink positioning reference signal and transmit the SL PRS using the resource. Multiple supporting terminal devices may be configured to transmit SL-PRS to the target terminal device. For example, different random sequence seed or different cyclic shift can be configured for SL-PRS transmission.

In some embodiments, the reception of the DL PRS and the transmission of the SL PRS may be in asynchronous mode. For example, the first device 110-1 may simply listen to the DL PRS and regard the first symbol of the DL PRS as a trigger. In this situation, after detecting the DL PRS, the first device 110-1 may transmit the SL PRS right away. A guard period after the DL PRS transmission may be reserved to ensure the next slot is not interfered with by the SL PRS.

In one embodiment, the first device 110-1 may be assigned a comb offset to ensure orthogonality between the DL PRS and SL PRS. Alternatively or in addition, semi-orthogonal resource may be allocated to the first device 110-1 such as different random sequence seed or different cyclic shift.

In an example embodiment, the SL PRS and the DL PRS may be transmitted in the same frequency band or bandwidth part. Alternatively or in addition, the DL PRS and the SL PRS may be transmitted at different frequency bands or bandwidth parts. This may depend on the capabilities of the first device 110-1 and the fourth device 110-2.

At block 440, the first device 110-1 measures the time difference between the reception of the DL PRS and the transmission of the SL PRS. In this way, the positioning performance of sidelink assisted positioning has been improved. In some embodiments, the first device 110-1 may measure the reference signal time difference (RSTD) based on the reception of the DL PRS and the transmission of the SL PRS. The RSTD may be transmitted from the first device 110-1 to the second device 120.

At block 450, the first device 110-1 transmits an indication of the time difference to the second device 120 and/or the fourth device 110-2. For example, the first device 110-1 may establish the LPP session with the second device 120 and transmit the indication of the time difference to the second device 120 using the LPP session. The first device 110-1 may transmit the indication of the RSTD using the DL PRS to the second device 120. The indication of the RSTD may be transmitted together with the indication of the time difference or separately.

Alternatively or in addition, the first device 110-1 may transmit the indication of the time difference to the fourth device 110-2. In one embodiment, a sidelink communication link between the first device 110-1 and the second device 110-2 may be established and the first device 110-1 may transmit the indication of the time difference to the second device 110-2 via the sidelink communication link.

Figure 5:
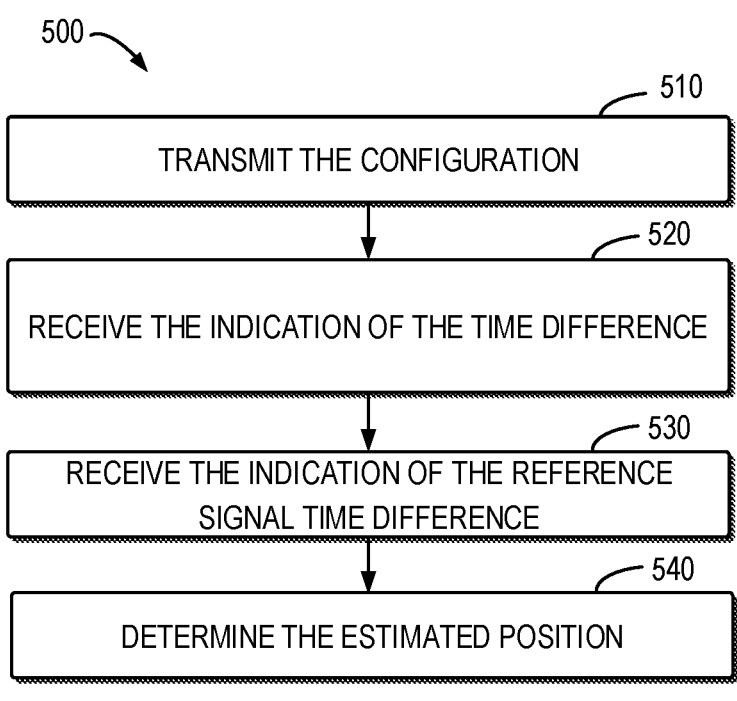
FIG. 5 illustrates a flow chart of a method according to embodiments of the present disclosure.

FIG. 5 illustrates a flow chart of method 500. The method 500 can be implemented at any suitable devices. For example, the method may be implemented at the second device 120.

In some embodiments, the second device 120 may receive a request for sidelink assisted positioning. The second device 120 may receive the request when the first device 110-1 requests positioning services on behalf of the forth device 110-2. Alternatively, the second device 120 may receive the request when the LPP session is initiated by the second device 120.

In other embodiments, the second device 120 may determine synchronization levels between the third devices 130 (for example, between network devices) to determine whether to configure the sidelink assisted positioning based on. Alternatively or in addition, the second device 120 may determine synchronization levels between the third device 130 and the first device 110-1 to determine whether to configure the sidelink assisted positioning. If the synchronization level exceeds a threshold level, the second device 120 may determine to configure the sidelink assisted positioning.

For example, the second device 120 may know based on synchronization reports that a target terminal device will only receive the PRS from two network devices within the acceptable error range for time synchronization. In that case the terminal device may need sidelink PRS transmission to meet the accuracy requirements.

At block 510, the second device 120 transmits the configuration for transmitting the sidelink PRS. The configuration may be transmitted in the LPP signaling. Alternatively, the configuration may also be transmitted in other positioning protocol signaling. In some embodiments, the second device 120 may transmit the configuration to measure PRS for sidelink assisted positioning to the fourth device 110-2.

At block 520, the second device receives an indication of the time difference measured by the first device 110-1. The indication of the time difference measured by the first device 110-1 may be received directly from the first device 110-1. Alternatively or in addition, the indication of the time difference measured by the first device 110-1 may be received from the fourth device 110-2. The second device 120 may receive the indication of the RSTD measured by the first device 110-1 using the DL PRS. The indication of the RSTD may be received together with the indication of the time difference or separately.

At block 530, the second device 120 receives an indication of the RSTD measured by the fourth device 110-2 based on the DL PRS transmitted from the second device 120 and the SL PRS transmitted from the first device 110-1 to the fourth device 110-2.

At block 540, the second device 120 determines the position of the fourth device based on the time difference from the first device 110-1 and the RSTD from the fourth device 110-2. In some embodiments, the second device 120 may update the RSTD from the fourth device 110-2 by using the time difference from the first device 110-1 with the propagation delay between the first device 110-1 and the third device 130. In this way, errors in synchronization may be significantly smaller. The position of the first device 110-1 must be known to the second device 120. In some embodiments, the position of the first device 110-1 can be estimated by the second device 120 through the RSTD received from the first device 110-1.

In some embodiments, the second device 120 may receive the indication of the Tx-Rx time difference measured by the third device 130. In a further embodiment, the second device 120 may use the Tx-Rx time difference received from the third device 130 together with Rx-Tx time difference received from the first device 110-1 to obtain the propagation delay between the first device 110-1 and the third device 130.

Figure 6:
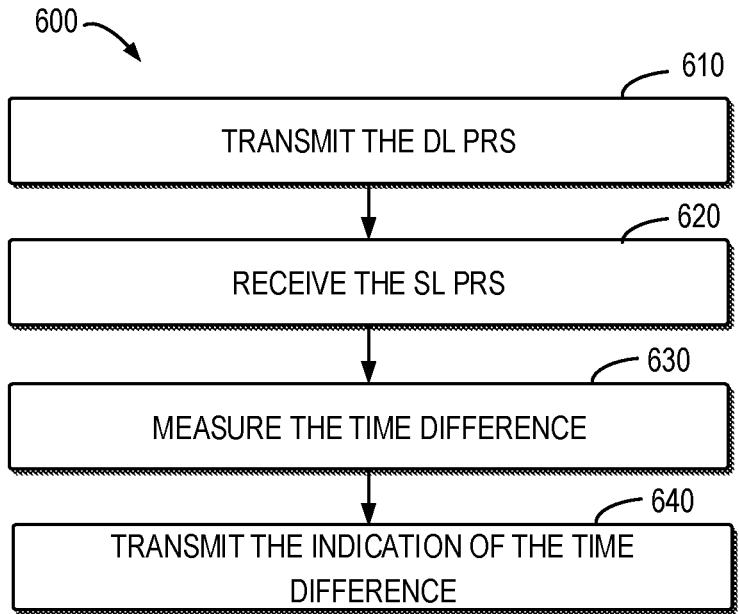
FIG. 6 illustrates a flow chart of a method according to embodiments of the present disclosure.

FIG. 6 illustrates a flow chart of method 600. The method 600 can be implemented at any suitable devices. For example, the method may be implemented at the third device 130.

At block 610, the third device 130 transmits the DL PRS to the first device 110-1. The third device 130 may also transmit the DL PRS to the fourth device 110-2. At block 620, the third device 130 receives the SL PRS from the first device 110-1.

At block 630, the third device 130 measures a Tx-Rx time difference between when it transmits DL PRS and when it receives SL PRS from the first device 110-1. At block 640, the third device 130 transmits the indication of the Tx-Rx time difference to the second device 120.

Figure 7:
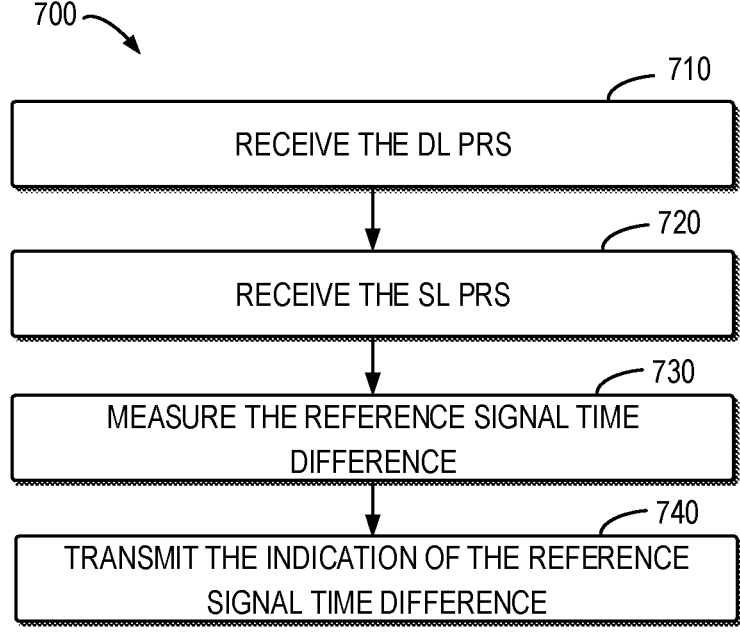
FIG. 7 illustrates a flow chart of a method according to embodiments of the present disclosure.

FIG. 7 illustrates a flow chart of method 700. The method 700 can be implemented at any suitable devices. For example, the method may be implemented at the fourth device 110-2.

In some embodiments, the fourth device 110-2 may receive the configuration to measure PRS for sidelink assisted positioning from the second device 120.

At block 710, the fourth device 110-2 receives the DL PRS from the third device 130. At block 720, the fourth device 110-2 receives the SL PRS from the first device 110-1. In some embodiments, the fourth device 110-2 may receive the indication of the time difference measured by the first device 110-1. For example, the indication of the time difference measured by the first device 110-1 may be received directly from the first device 110-1 via the sidelink. For example, the fourth device 120 may establish the sidelink communication link with the first device 110-1 and receive the indication of the time difference from the first device 120. Alternatively or in addition, the he indication of the time difference measured by the first device 110-1 may be received from the second device 120.

At block 730, the fourth device 110-2 measures the RSTD using the DL PRS received from the second device 120 and the SL PRS received from the first device 110-1.

At block 740, the fourth device 110-2 transmits an indication of the RSTD measured based on the DL PRS received from the second device 120 and the SL PRS received from the first device 110-1 to the second device 120. In some embodiments, the fourth device 110-2 may determine 2065 its position based on the RSTD measured by the fourth device 110-2 and the time difference measured by the first device 110-1.

In some embodiments, an apparatus for performing the method 400 (for example, the first device 110-1) may comprise respective means for performing the corresponding steps in the method 400. These means may be implemented in any suitable manners. For example, it can be implemented by circuitry or software modules.

In some embodiments, the apparatus comprises means for receiving, at a first device and from a second device, a configuration for transmitting a sidelink positioning reference signal; means for receiving a downlink positioning reference signal from a third device; means for transmitting the sidelink positioning reference signal to a fourth device; means for measuring a time difference between the reception of the downlink positioning reference signal and the transmission of the sidelink positioning reference signal; and means for transmitting an indication of the time difference to the second device and/or the fourth device.

In some embodiments, the apparatus comprises means for receiving information indicating that the reception of downlink positioning reference signal triggers the transmission of the sidelink positioning reference signal to the fourth device.

In some embodiments, the means for transmitting the sidelink positioning reference signal comprises: means for in response to detecting the downlink positioning reference signal, transmitting the sidelink positioning reference signal in an asynchronous manner.

In some embodiments, the means for transmitting the sidelink positioning reference signal comprises: means for obtaining further information concerning a resource allocated for the transmission of the sidelink positioning reference signal; and means for transmitting the sidelink positioning reference signal using the resource.

In some embodiments, the further information comprise a comb offset between the downlink positioning reference signal and the sidelink positioning reference signal.

In some embodiments, the means for transmitting the sidelink positioning reference signal comprises: means for obtaining, from the configuration, a predetermined time delay between the downlink positioning reference signal and the sidelink positioning reference signal; and means for transmitting the sidelink positioning reference signal based on the predetermined time delay.

In some embodiments, the apparatus comprises means for measuring a reference signal time difference based on at least the reception of the downlink positioning reference signal; and means for transmitting an indication of the reference signal time difference to the second device.

In some embodiments, the means for transmitting the indication of the time difference comprises: means for establishing a sidelink with the fourth device; and means for transmitting the indication of the time difference to the fourth device on the sidelink.

In some embodiments, the first device comprises a terminal device, a second device comprises a location management function device, a third device comprises a network device and the fourth device comprises a further terminal device.

In some embodiments, an apparatus for performing the method 500 (for example, the second device 120) may comprise respective means for performing the corresponding steps in the method 500. These means may be implemented in any suitable manners. For example, it can be implemented by circuitry or software modules.

In some embodiments, the apparatus comprises means for transmitting, at a second device and to a first device, a configuration for transmitting a sidelink positioning reference signal; means for receiving an indication of a time difference measured by the first device, the time difference being between a reception of a downlink positioning reference signal by the first device and a transmission of the sidelink positioning reference signal by the first device; means for receiving an indication of a reference signal time difference from a fourth device, the reference signal time difference being between a reception of the downlink positioning reference signal by the fourth device and a reception of the sidelink positioning reference signal by the fourth device; and means for determining an estimated position of the fourth device based at least in part on the time difference and the reference signal time difference.

In some embodiments, the means for transmitting the configuration for transmitting the sidelink positioning reference signal comprises: means for determining a synchronization level between the first device and a third device or between the third device and at least a fifth device; and means for in accordance with a determination that the synchronization level exceeds a threshold level, transmitting the configuration to the first device.

In some embodiments, the means for receiving the first indication of the time difference comprises: means for receiving the indication of the time difference from the fourth device.

In some embodiments, the apparatus comprises means for receiving an indication of a further time difference measured by the third device, the further time difference being between a transmission of the downlink positioning reference signal by the third device and a reception of the sidelink positioning reference signal by the third device; means for determining a propagation delay estimate between the first device and the third device based on the time difference and the further time difference; and means for updating synchronization between the first device and the third device based on the time difference and the propagation delay estimate.

In some embodiments, the means for determining the estimated position of the fourth device comprises: means for updating the reference signal time difference with the time difference.

In some embodiments, the apparatus comprises means for receiving an indication of a further reference signal time difference measured by the first device based on a reception of the downlink positioning reference signal; and means for estimating a position of the first device based on the further reference signal time difference.

In some embodiments, the first device comprises a terminal device, a second device comprises a location management function device, a third device comprises a network device, the fourth device comprises a further terminal device and the fifth device comprises a further network device.

In some embodiments, an apparatus for performing the method 600 (for example, the third device 130) may comprise respective means for performing the corresponding steps in the method 600. These means may be implemented in any suitable manners. For example, it can be implemented by circuitry or software modules.

In some embodiments, the apparatus comprises means for transmitting, at a third device, a downlink positioning reference signal to a first device; means for receiving a sidelink positioning reference signal from the first device; means for measuring a time difference between the transmission of the downlink positioning reference signal and the reception of the sidelink positioning reference signal; and means for transmitting an indication of the time difference to a second device.

In some embodiments, the first device comprises a terminal device, a second device comprises a location management function device, a third device comprises a network device and the fourth device comprises a further terminal device.

In some embodiments, an apparatus for performing the method 700 (for example, the fourth device 110-2) may comprise respective means for performing the corresponding steps in the method 700. These means may be implemented in any suitable manners. For example, it can be implemented by circuitry or software modules.

In some embodiments, the apparatus comprises means for receiving, at a fourth device, a downlink positioning reference signal from a third device; means for receiving a sidelink positioning reference signal from a first device; means for measuring a reference signal time difference based on the reception of the downlink positioning reference signal and the reception of sidelink positioning reference signal; and means for transmitting an indication of the reference signal time difference to a second device.

In some embodiments, the apparatus comprises means for receiving an indication of a time difference measured by the first device, the time difference between the reception of the downlink positioning reference signal and the transmission of the sidelink positioning reference signal by the first device; and means for determining an estimated position of the fourth device based on the reference signal time difference and the time difference received from the first device.

In some embodiments, the means for receiving the time difference comprises: means for receiving the indication of the time difference from the first device and/or from the second device.

In some embodiments, the first device comprises a terminal device, a second device comprises a location management function device, a third device comprises a network device and the fourth device comprises a further terminal device.

Figure 8:
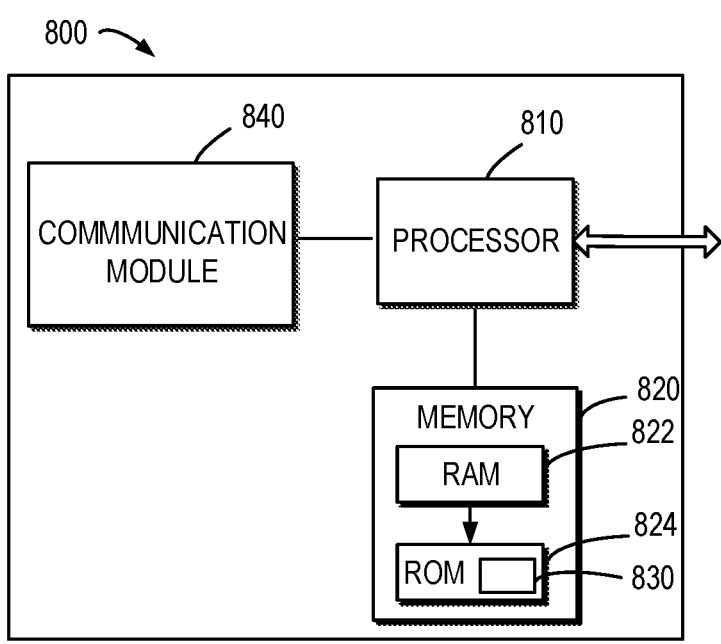
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example the first device 110-1, the second device 120, the third device 130 or the fourth device 110-2 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 820 so that the device 800 may perform any process of the disclosure as discussed with reference to FIGS. 2 and 7. The embodiments of the present disclosure may also be implemented by hardware or by a combination of software and hardware.

Figure 9:
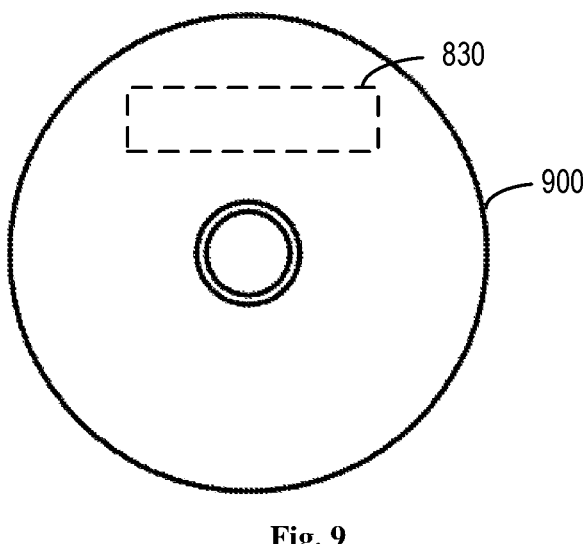
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 800 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 600 may be instead comprised in the distributed unit, and at least some of the described processes may be performed by the distributed unit.

In an embodiment, the execution of at least some of the functionalities of the device 600 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 800 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-700 as described above with reference to FIGS. 4-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:

transmitting, at a second device and to a first device, a configuration for transmitting a sidelink positioning reference signal;

receiving an indication of a time difference measured with the first device, the time difference being between a reception of a downlink positioning reference signal with the first device and a transmission of the sidelink positioning reference signal with the first device;

receiving an indication of a reference signal time difference from a fourth device, the reference signal time difference being between a reception of the downlink positioning reference signal with the fourth device and a reception of the sidelink positioning reference signal with the fourth device; and determining an estimated position of the fourth device based at least in part on the time difference and the reference signal time difference.

2. The method of claim 1, wherein transmitting the configuration for transmitting the sidelink positioning reference signal comprises:

determining a synchronization level between the first device and a third device or between the third device and at least a fifth device; and in accordance with a determination that the synchronization level exceeds a threshold level, transmitting the configuration to the first device.

3. The method of claim 1, wherein the receiving of the indication of the time difference comprises receiving the indication of the time difference from the fourth device.

4. The method of claim 1, further comprising:

receiving an indication of a further time difference measured with a third device, the further time difference being between a transmission of the downlink positioning reference signal with the third device and a reception of the sidelink positioning reference signal with the third device;

determining a propagation delay estimate between the first device and the third device based on the time difference and the further time difference; and updating a synchronization between the first device and the third device based on the time difference and the propagation delay estimate.

5. The method of claim 1, wherein determining the estimated position of the fourth device comprises:

updating the reference signal time difference with the time difference.

6. The method of claim 1, further comprising:

receiving an indication of a further reference signal time difference measured with the first device based on at least a reception of the downlink positioning reference signal; and determining an estimated position of the first device based on the further reference signal time difference.

7. The method of claim 1, wherein the first device comprises a terminal device, a second device comprises a location management function device, a third device comprises a network device, the fourth device comprises a further terminal device and a fifth device comprises a further network device.

8. A second device comprising:

at least one processor; and at least one non-transitory memory including computer program codes;

the at least one memory and the computer program codes are configured to, with the at least one processor, cause the second device to perform:

transmit to a first device, a configuration for transmitting a sidelink positioning reference signal;

receive an indication of a time difference measured with the first device, the time difference being between a reception of a downlink positioning reference signal with the first device and a transmission of the sidelink positioning reference signal with the first device;

receive an indication of a reference signal time difference from a fourth device, the reference signal time difference being between a reception of the downlink positioning reference signal with the fourth device and a reception of the sidelink positioning reference signal with the fourth device; and determine an estimated position of the fourth device based at least in part on the time difference and the reference signal time difference.

9. A non-transitory computer readable storage medium comprising program instructions stored thereon, the instructions, when executed by an apparatus, causing the apparatus to perform the method of claim 1.

* * * * *